(12) United States Patent
Chi et al.

(10) Patent No.: US 11,171,682 B2
(45) Date of Patent: Nov. 9, 2021

(54) DUAL POLARIZATION MILLIMETER-WAVE FRONTEND INTEGRATED CIRCUIT

(71) Applicants: Swiftlink Technologies Inc., Richmond (CA); SWIFTLINK TECHNOLOGIES CO., LTD., Suzhou (CN)

(72) Inventors: Taiyun Chi, Atlanta, GA (US); Thomas Chen, Vancouver (CA)

(73) Assignees: SWIFTLINK TECHNOLOGIES INC., Richmond (CA); SWIFTLINK TECHNOLOGIES CO., LTD., Suzhou (CN)

( * ) Notice: Subject to any disclaimer, the term of this patent is extended or adjusted under 35 U.S.C. 154(b) by 0 days.

(21) Appl. No.: 16/262,838

(22) Filed: Jan. 30, 2019

(65) Prior Publication Data
US 2020/0244302 A1   Jul. 30, 2020

(51) Int. Cl.
*H04B 1/44* (2006.01)
(52) U.S. Cl.
CPC .................... *H04B 1/44* (2013.01)
(58) Field of Classification Search
CPC ........... H04B 7/0613–0617; H04B 7/04–0413; H04B 1/005–0096; H01Q 3/28–38
USPC ........................................................ 455/83
See application file for complete search history.

(56) References Cited

U.S. PATENT DOCUMENTS

| 4,259,741 | A | * | 3/1981 | Kawai | H04B 7/2046 370/323 |
| 6,417,737 | B1 | * | 7/2002 | Moloudi | H03B 21/01 330/301 |
| 6,760,577 | B2 | * | 7/2004 | Li | H03D 7/18 329/304 |
| 6,766,148 | B1 | * | 7/2004 | Mohindra | H04B 1/04 455/73 |
| 8,957,722 | B2 | * | 2/2015 | Zienkewicz | H03D 7/165 327/355 |
| 9,813,269 | B1 | * | 11/2017 | Yoon | H04B 1/40 |
| 10,200,098 | B2 | * | 2/2019 | McMorrow | H04B 7/1851 |
| 10,693,687 | B1 | * | 6/2020 | Kushnir | H04L 27/0014 |
| 2002/0058513 | A1 | * | 5/2002 | Klein | H04W 16/02 455/447 |

(Continued)

*Primary Examiner* — Jinsong Hu
*Assistant Examiner* — Rui M Hu
(74) *Attorney, Agent, or Firm* — Womble Bond Dickinson (US) LLP (57) ABSTRACT

According to one embodiment, an RF frontend IC device includes a first array of transceivers to transmit and receive RF signals of a first polarization associated with a first set of RF channels. The device includes a second array of transceivers to transmit and receive RF signals of a second polarization associated with a second set of RF channels. The device includes a first converter coupled to each transceiver of the first array of transceivers and a second converter coupled to each transceiver of the second array of transceivers. The first converter is to up-convert or down-convert a signal of the first polarization based on a LO signal. The second converter is to up-convert or down-convert a signal of the second polarization based on the LO signal. The first and second array of transceivers, and the first and second converters may be implemented within a single IC chip.

20 Claims, 7 Drawing Sheets

(56) References Cited

U.S. PATENT DOCUMENTS

| | | | |
|---|---|---|---|
| 2002/0177425 A1* | 11/2002 | Li | H03D 7/18 455/296 |
| 2003/0129955 A1* | 7/2003 | Gilmore | H03D 7/166 455/303 |
| 2003/0157909 A1* | 8/2003 | Atkinson | H04B 1/006 455/130 |
| 2003/0162566 A1* | 8/2003 | Shapira | H04B 7/10 455/561 |
| 2004/0095278 A1* | 5/2004 | Kanemoto | H04B 7/10 343/700 MS |
| 2004/0106380 A1* | 6/2004 | Vassiliou | H04B 17/20 455/73 |
| 2005/0124377 A1* | 6/2005 | Shih | H04B 1/005 455/552.1 |
| 2006/0281427 A1* | 12/2006 | Isaac | H03D 3/008 455/209 |
| 2007/0047669 A1* | 3/2007 | Mak | H03H 11/1291 375/316 |
| 2007/0099582 A1* | 5/2007 | Chen | H04B 1/0071 455/76 |
| 2009/0121844 A1* | 5/2009 | Repke | H04Q 9/00 340/10.42 |
| 2010/0260076 A1* | 10/2010 | Corman | H04B 1/44 370/277 |
| 2011/0053529 A1* | 3/2011 | Furuya | H03D 7/1433 455/114.2 |
| 2011/0223878 A1* | 9/2011 | Lin | H04B 1/1027 455/226.2 |
| 2012/0287978 A1* | 11/2012 | O'Keeffe | H01Q 21/245 375/222 |
| 2012/0300888 A1* | 11/2012 | Mallinson | H04B 1/302 375/349 |
| 2013/0058388 A1* | 3/2013 | Muhammad | H04B 15/04 375/222 |
| 2013/0059617 A1* | 3/2013 | Li | H04W 16/28 455/507 |
| 2013/0063199 A1* | 3/2013 | Han | H03D 7/165 327/355 |
| 2013/0072125 A1* | 3/2013 | Yoon | H04B 7/10 455/67.11 |
| 2013/0088391 A1* | 4/2013 | Corman | H01Q 15/242 342/365 |
| 2014/0104106 A1* | 4/2014 | Corman | H01Q 3/34 342/363 |
| 2015/0123873 A1* | 5/2015 | Perumana | H01Q 21/20 343/876 |
| 2016/0065388 A1* | 3/2016 | Kakishima | H04L 5/0053 370/329 |
| 2016/0218425 A1* | 7/2016 | Mohamadi | H01Q 21/065 |
| 2018/0069296 A1* | 3/2018 | Rofougaran | H01Q 3/40 |
| 2018/0287678 A1* | 10/2018 | Kihira | H01Q 9/0435 |
| 2018/0294834 A1* | 10/2018 | Wang | H03F 3/68 |
| 2018/0316383 A1* | 11/2018 | Kamgaing | H04B 1/401 |
| 2018/0335518 A1* | 11/2018 | Fox | G01S 7/025 |
| 2019/0081596 A1* | 3/2019 | Dunworth | H03F 3/211 |
| 2019/0103911 A1* | 4/2019 | Gharavi | H01Q 1/246 |
| 2019/0214724 A1* | 7/2019 | Schrattenecker | G01S 13/88 |
| 2019/0267709 A1* | 8/2019 | Mow | H01Q 3/28 |
| 2019/0280394 A1* | 9/2019 | Cheng | H01Q 21/062 |
| 2019/0379119 A1* | 12/2019 | He | H01Q 21/28 |
| 2020/0217951 A1* | 7/2020 | Park | G01S 13/343 |

\* cited by examiner

DUAL POLARIZATION MILLIMETER-WAVE FRONTEND INTEGRATED CIRCUIT

FIELD OF THE INVENTION

Embodiments of the present invention relate generally to mobile devices. More particularly, embodiments of the invention relate to dual polarization millimeter-wave (mm-wave) frontend integrated circuits.

BACKGROUND

As wireless communications technologies evolve, wireless radio frequency (RF) communication between base stations and/or small cells is becoming a substitute to wired communication. In radio communications, a base station is a wireless communications station installed at a fixed location and can be used to communicate as part of cellular cell site. Generally, communications between base stations and/or small cells and/or end destination are wired communication due to a limited bandwidth. For example, communication from a base station to a cell site or a cell site to a home is typically a wired fiber communication.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to a first aspect, a RF frontend IC device includes a first array of one or more transceivers to transmit and receive RF signals of a first polarization associated with a first set of RF channels, where each of the transceivers transmits and receives an RF signal according to an amplitude and phase shift setting for a predetermined frequency band associated with a respective RF channel of the first set. The RF frontend IC device includes a second array of one or more transceivers to transmit and receive RF signals of a second polarization associated with a second set of RF channels, wherein each of the transceivers transmits and receives an RF signal according to an amplitude and phase shift setting for the predetermined frequency band associated with a respective RF channel of the second set. The RF frontend IC device includes a first converter coupled to each transceiver of the first array of transceivers, where the first converter is to up-convert a first intermediate frequency (IF) signal of the first polarization based on a LO signal into a first RF signal of the first polarization to be transmitted by the first array of transceivers, wherein the first converter is to down-convert a second RF signal of the first polarization received from the first array of transceivers based on the LO signal into a second IF signal of the first polarization. The RF frontend IC device includes a second converter coupled to each transceiver of the second array of transceivers, where the second converter is to up-convert a first IF signal of the second polarization based on a LO signal into a first RF signal of the second polarization to be transmitted by the second array of transceivers, where the converter is to down-convert a second RF signal of the second polarization received from the second array of transceivers based on the LO signal into a second IF signal of the second polarization. The first array of transceivers, the second array of transceivers, the first converter, and the second converter may be implemented within a single IC chip as a single frontend IC chip or package.

In one embodiment, each of the transceivers of the first array or the second array includes a transmitter to transmit RF signals to a remote device, a receiver to receive RF signals from the remote device, an antenna to transmit or receive RF signals over the air, and a first transmit/receive switch configured to couple the transmitter or the receiver to the antenna at a given point in time to transmit or to receive RF signals. The device includes a second transmit/receive switch configured to couple the transmitter to a transmitting path of a converter and the receiver to a receiving path of the converter at a given point in time to transmit or to receive RF signals, where the converter is the first converter for the transceivers of the first array and the converter is the second converter for the transceivers of the second array. In another embodiment, the antenna of each transceiver of the first array corresponds to the first polarization, and where the antenna of each transceiver of the second array corresponds to the second polarization.

In another embodiment, the first converter includes an up-converter to up-convert a first IF signal of the first polarization based on the LO signal into a first RF signal of the first polarization, a down-converter to down-convert a second RF signal of the first polarization into a second IF signal of the first polarization, and a first transmit/receive switch configured to couple the up-converter or the down-converter to the first array of transceivers at a given point in time to up-convert the first IF signal or down-convert the second RF signal.

In another embodiment, the second converter includes an up-converter to up-convert the first IF signal of the second polarization based on the LO signal into the first RF signal of the second polarization, a down-converter to down-convert a second RF signal of the second polarization into a second IF signal of the second polarization, and a first switch configured to couple the up-converter or the down-converter to the first array of transceivers at a given point in time to up-convert the first IF signal or down-convert the second RF signal.

In another embodiment, an input port of the up-converter is coupled to an IF input port and an output port of the down-converter is coupled to an IF output port, and the IF input and output ports correspond to the first polarization. In another embodiment, the first converter further includes a second transmit/receive switch configured to couple the up-converter or the down-converter to an IF IO port at a given point in time, where the IF IO port corresponding to the first polarization.

In one embodiment, the device includes a first power combiner/divider coupled between the first array and the first converter to combine/divide RF signals for the transceivers of the first array, and a second power combiner/divider coupled between the second array and the second converter to combine/divide RF signals for the transceivers of the second array. In one embodiment, the first polarization is a horizontal polarization and the second polarization is a vertical polarization. In one embodiment, the first polarization is a left hand circular polarization and the second polarization is a right hand circular polarization.

According to a second aspect, an RF frontend IC device includes a first transceiver to transmit and receive RF signals at a first and a second polarization associated with a first RF channel according to an amplitude and phase shift setting within a predetermined frequency band. The device includes a second transceiver to transmit and receive RF signals at the first and second polarization associated with a second RF channel according to an amplitude and phase shift setting within the predetermined frequency band. The device includes a converter coupled to the first and the second transceivers, where the converter is to up-convert a first intermediate frequency (IF) signal based on a LO signal into a first RF signal to be transmitted by the first or the second transceivers, where the converter is to down-convert a second RF signal received from the first or the second transceivers based on the LO signal into a second IF signal. The first transceiver, the second transceiver, and the converter may be embedded within a single IC chip.

According to one embodiment, each of the first or the second transceiver includes a transmitter to transmit RF signals to a remote device, a receiver to receive RF signals from the remote device. The transceiver includes a first antenna of the first polarization to transmit or receive RF signals of the first polarization over the air and a second antenna of the second polarization to transmit or receive RF signals of the first polarization over the air. The transceiver includes a first transmit/receive switch configured to couple the transmitter or the receiver to the first or the second antenna at a given point in time to transmit or to receive RF signals, a polarization switch configured to couple the transmitter or the receiver to the antenna at a given point in time to transmit/receive the first polarization or the second polarization of the RF signals, and a second transmit/receive switch configured to couple the transmitter to a transmitting path of the converter and the receiver to a receiving path of the converter at a given point in time to transmit or to receive RF signals.

In one embodiment, the first converter includes an up-converter to up-convert a first IF signal based on the LO signal into a first RF signal, a down-converter to down-convert a second RF signal into a second IF signal, and a first transmit/receive switch configured to couple the up-converter or the down-converter to the first and second transceivers at a given point in time to up-convert the first IF signal or down-convert the second RF signal. In another embodiment, the first converter further includes a second transmit/receive switch configured to couple the up-converter or the down-converter to an IF input/output (TO) port at a given point in time. In another embodiment, an input port of the up-converter is coupled to an IF input port and an output port of the down-converter is coupled to an IF output port.

In one embodiment, a power combiner/divider coupled between the first transceiver, the second transceiver and the converter to combine/divide the RF signals of the first transceiver and the second transceiver. In one embodiment, the first polarization is a horizontal polarization and the second polarization is a vertical polarization. In one embodiment, the first polarization is a left hand circular polarization and the second polarization is a right hand circular polarization.

Figure 1:
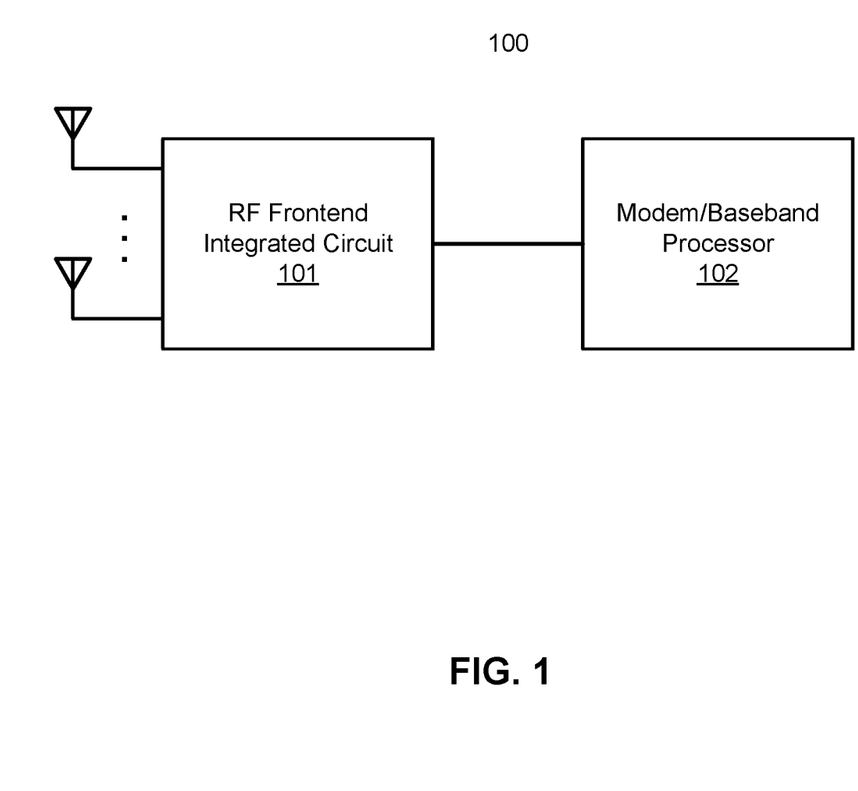
FIG. 1 is a block diagram illustrating an example of a wireless communication device according one embodiment of the invention.

FIG. 1 is a block diagram illustrating an example of a wireless communication device according one embodiment of the invention. Referring to FIG. 1, wireless communication device 100, also simply referred to as a wireless device, includes, amongst others, an mm-wave frontend module 101 (also simply referred to as an RF frontend module) and a modem or a baseband processor 102. A modem may include an IF-to-baseband frequency (IF/BF) down-converter, a BF/IF up-converter, and a baseband processor (e.g., a digital processing processor or DSP). Wireless device 100 can be any kind of wireless communication devices such as, for example, mobile phones, laptops, tablets, network appliance devices (e.g., Internet of thing or TOT appliance devices), etc. Alternatively, wireless device 100 may represent a base station, cellular tower, or any link of a network/subnetwork, etc.

In a radio receiver circuit, an RF frontend, such as an mm-wave RF frontend, is a generic term for all the circuitry between the antenna up to and including the mixer stage. It consists of all the components in a receiver that processes the signals at the original incoming RF frequency, before they are converted to a lower intermediate frequency. In microwave and satellite receivers it is often called the low-noise block (LNB) or low-noise downconverter (LND) and is often located at or near an antenna, so that the signals from the antenna can be transferred to the rest of the receiver at the more easily handled intermediate frequency. A baseband processor is a device (a chip or part of a chip) in a network interface that manages all the radio functions (all functions that require an antenna).

In one embodiment, RF frontend module 101 includes a first and a second array of RF transceivers (e.g., mm-wave RF transceivers) for a dual polarization IC chip. Each of the RF transceivers transmits and receives coherent RF signals (e.g., mm-wave signals) within a particular frequency band (e.g., a particular range of frequencies such as non-overlapped frequency ranges) for a particular polarization via one of a number of mm-wave antennas. For example, the first array of transceivers can transmit/receive RF signals within a number of frequency bands in a first polarization and the second array of transceivers can transmit/receive the RF signals within the number of frequency bands in a second polarization for a dual polarization.

In mm-wave technology, MM waves occupy the frequency spectrum ranging from 30 GHz to 300 GHz. The frontend IC chip 101 can further includes a full-band or wideband frequency synthesizer coupled to the RF transceivers. In another embodiment, the synthesizer can be coupled to the RF transceivers via one or more converters. The wideband frequency synthesizer can generate and provide a local oscillator (LO) signal to the converter(s) to enable the converter(s) to mix, modulate, and/or demodulate RF signals within a wide frequency band (e.g., 24-43 GHz) for the RF transceivers. The array of RF transceivers, converters, and the wideband frequency synthesizer may be integrated within a single IC chip as a single RF frontend IC chip or package.

Note that for the purposes of illustration only, an mm-wave frontend module is utilized as an example of an RF frontend module. Similarly, an mm-wave transceiver is utilized as an example of an RF transceiver. However, the techniques described throughout this application can also be applicable to other RF circuits in other frequency spectrums or frequency bands. Note that the RF transceivers can be integrated with the converter(s) into a single module.

Figure 2:
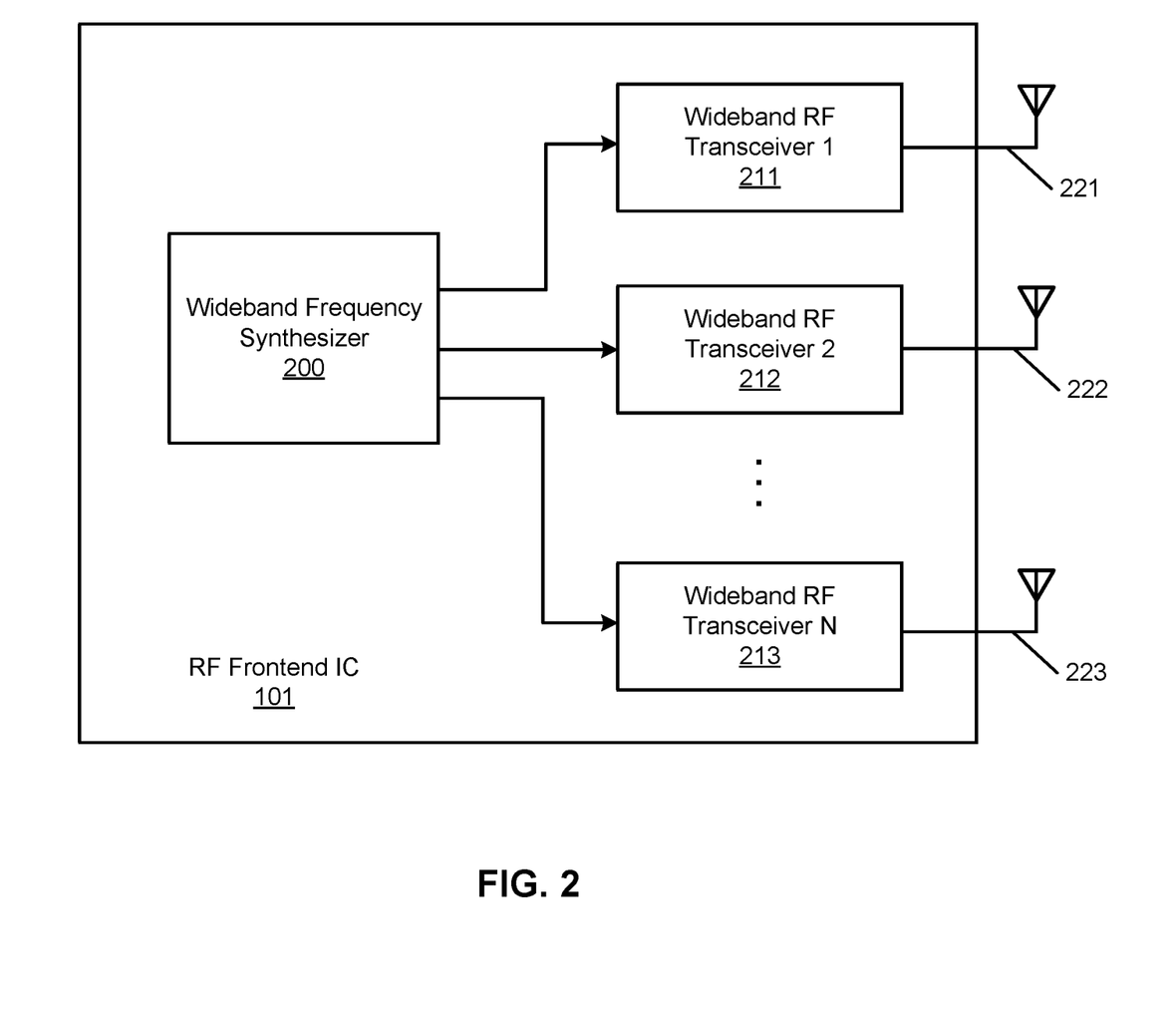
FIG. 2 is a block diagram illustrating an example of an RF frontend integrated circuit according to one embodiment.

FIG. 2 is a block diagram illustrating an example of an RF frontend integrated circuit according to one embodiment of the invention. RF frontend IC device 101 may be an mm-wave frontend IC device. Referring to FIG. 2, RF frontend 101 includes, amongst others, a wideband or full-band frequency synthesizer 200 coupled to one or more RF transceivers 211-213. Each of RF transceivers 211-213 is configured to transmit and receive coherent RF signals such as mm-wave signals with variable amplitudes and phase shifts via one of mm-wave antennas 221-223. By providing proper amplitude and phase shift settings for each of the transceivers 211-213, the transceiver arrays can steer one or multiple beams in the desired directions (referred to as beaming directions, or radiation angles or radiation directions). In one embodiment, each of transceivers 211-213 is configured to receive an LO signal from wideband frequency synthesizer 200. The LO signal is generated for a specific frequency band (e.g., 24-43 GHz band). The LO signal is utilized to mix, modulate, demodulate by each of transceivers 211-213 for the purpose of transmitting and receiving mm-wave signals within the corresponding frequency band.

Alternatively, each of RF transceivers 211-213 may be associated with a different frequency band, such as non-overlapped or minimum overlapped frequency ranges. Each transceiver is configured to transmit and receive RF signals within the corresponding frequency band using a specific LO signal for the corresponding frequency band, which is generated by frequency synthesizer 200.

In another embodiment, the synthesizer 200 can be coupled to the one or more RF transceivers 211-213 via one or more converters (not shown), and antennas 221-223 can be oriented to be a particular polarization, e.g., a vertical or horizontal linear polarization, or a left hand or right hand circular polarization. Each of RF transceivers 211-213 can then be configured to transmit and receive coherent RF signals such as mm-wave signals with variable amplitudes and phase shifts via one of mm-wave antennas 221-223 for the particular polarization. By providing proper amplitude and phase shift settings for each of the transceivers 211-213, the transceivers can steer one or multiple beams in the desired directions (referred to as beaming directions, or radiation angles or radiation directions) for a respective polarization. In one embodiment, one or more converter(s) (not shown) for the transceivers 211-213 is configured to receive an LO signal from wideband frequency synthesizer 200. The LO signal is generated for a specific frequency band (e.g., 24-43 GHz band). The LO signal is utilized to mix, modulate, demodulate an RF signal for each of transceivers 211-213 for the purpose of transmitting and receiving mm-wave signals within the corresponding frequency band.

Alternatively, each of RF transceivers 211-213 may be associated with a particular polarization of a different frequency band. Each transceiver is configured to transmit and receive RF signals for a particular polarization within the corresponding frequency band using a specific LO signal for the corresponding frequency band, which is generated by frequency synthesizer 200.

Figure 3:
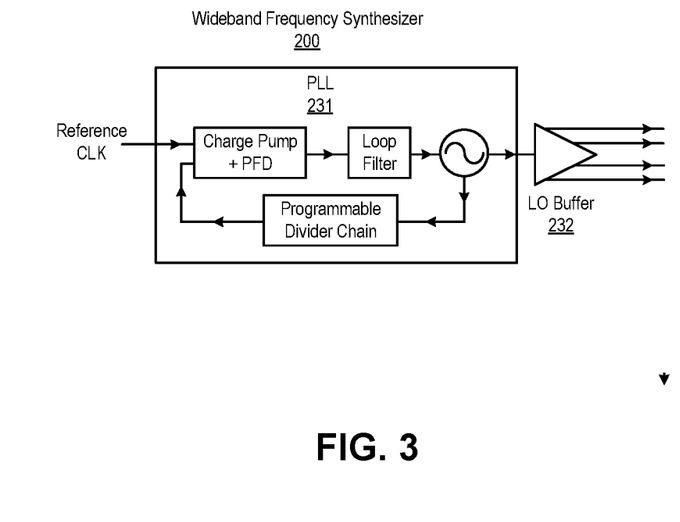
FIG. 3 is a block diagram illustrating an example of a frequency synthesizer according to one embodiment.

FIG. 3 is a block diagram illustrating an example of a frequency synthesizer according to one embodiment. In one embodiment, frequency synthesizer 200 includes a phase lock loop (PLL) circuitry 231 to generate the LO signal associated with the predetermined frequency band based on a clock reference signal, and an LO buffering device 232 coupled to the PLL circuitry to buffer and to provide one or more LO signals to converter(s) and/or transceiver(s).

A PLL is a control system that generates an output signal whose phase is related to the phase of an input signal. While there are several differing types, it is easy to initially visualize as an electronic circuit consisting of a variable frequency oscillator and a phase detector. The oscillator generates a periodic signal, and the phase detector compares the phase of that signal with the phase of the input periodic signal, adjusting the oscillator to keep the phases matched. Bringing the output signal back toward the input signal for comparison is called a feedback loop since the output is "fed back" toward the input forming a loop. Keeping the input and output phase in lock step also implies keeping the input and output frequencies the same. Consequently, in addition to synchronizing signals, a phase-locked loop can track an input frequency, or it can generate a frequency that is a multiple of the input frequency. These properties are used for computer clock synchronization, demodulation, and frequency synthesis. Phase-locked loops are widely employed in radio, telecommunications, computers and other electronic applications. They can be used to demodulate a signal, recover a signal from a noisy communication channel, generate a stable frequency at multiples of an input frequency (frequency synthesis), or distribute precisely timed clock pulses in digital logic circuits such as microprocessors.

Figure 4:
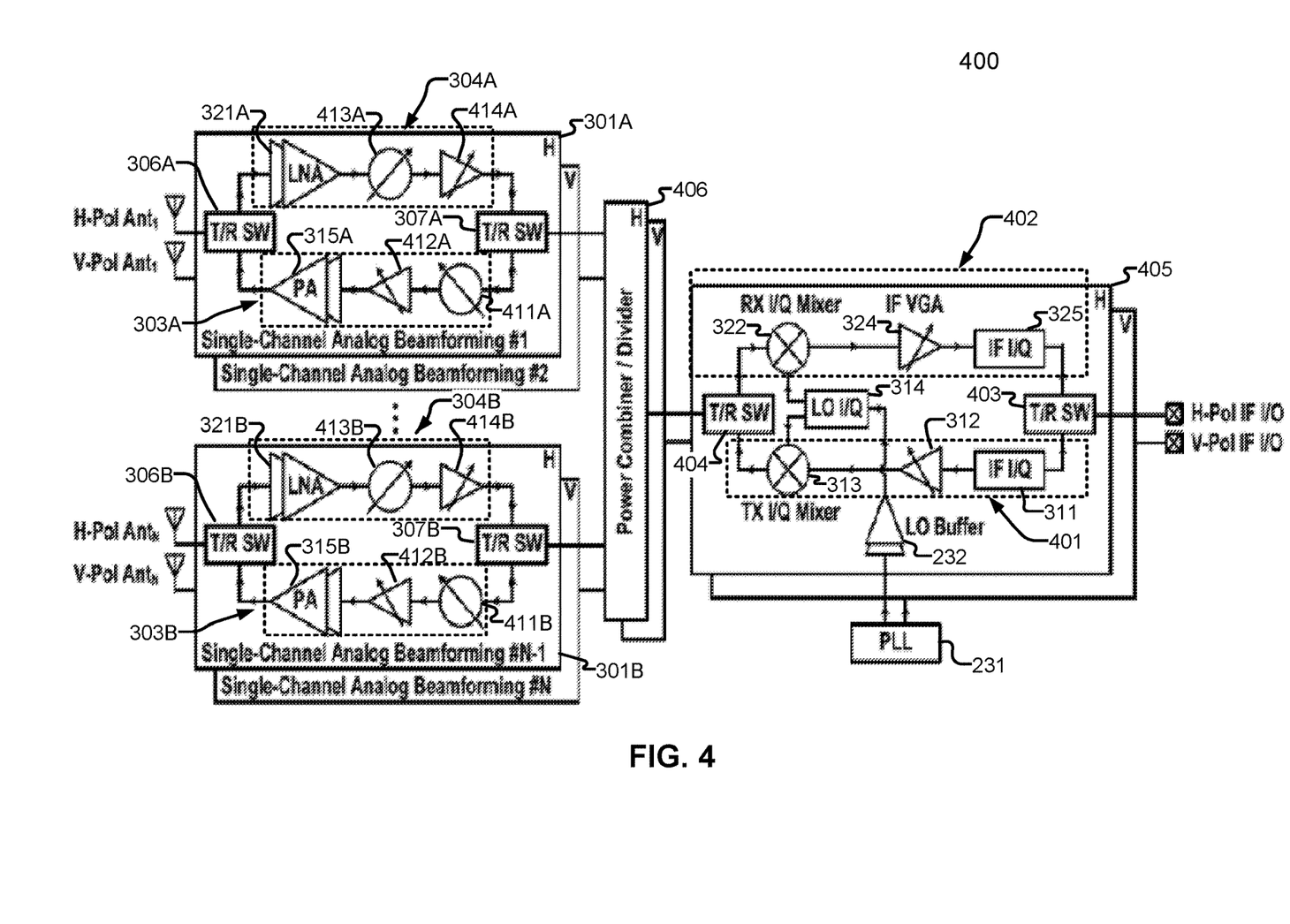
FIG. 4 is a block diagram illustrating an example of a dual-polarization millimeter-wave transceiver front-end with dual-stream combined transmitter (TX) input and receiver (RX) output input/output (IO) at intermediate frequency (IF) according to one embodiment.

FIG. 4 is a block diagram illustrating an example of a dual-polarization millimeter-wave transceiver front-end with dual-stream combined transmitter (TX) input and receiver (RX) output input/output (TO) at intermediate frequency (IF) according to one embodiment. RF frontend IC device 400 may represent RF frontend IC device 101 as described above. In one embodiment, RF frontend IC device 400 includes a first polarization (e.g., a horizontal polarization) circuitry (denoted by "H") and a second polarization (e.g., a vertical polarization) circuitry (denoted by "V"). The H circuitry is coupled to horizontal polarization IF TO, and antennas oriented to transmit and receive RF signals of the horizontal polarization. The V circuitry is coupled to vertical polarization IF TO, and antennas oriented to transmit and receive RF signals of the vertical polarization. The H circuitry mirrors the V circuitry except for the difference in polarization, however, separate H and V circuitries support a dual stream, e.g., twice the data bandwidth. For the purpose of illustration, only the H circuitry is described in the following paragraphs. Note that in some embodiments, the first polarization can be a left hand circular polarization and the second polarization can be a right hand circular polarization.

In one embodiment, the H circuitry of RF frontend IC device 400 includes an array of transceivers 301, each of the transceivers 301 corresponding to one of the RF channels. Each of the RF transceivers 301 includes a phase shifter configured to transmit and receive RF signals according to a respective beam direction within a predetermined frequency band. The RF frontend IC device further includes PLL 231 coupled to converter 405. PLL 231 generates LO signals for converter 405 to enable converter 405 to up convert IF signals and down convert RF signals for each of the transceivers 301 to transmit and receive RF signals within its respective RF channel.

Converter 405 further includes an up-converter 401 coupled to each of the transceivers 301 via power combiner/divider 406. The up-converter 401 is configured to up-convert a first IF signal based on a LO signal into a first RF signal to be transmitted by the transceivers 301. The RF frontend IC device 400 further includes a down-converter 402 coupled to each of the transceivers 301 via power combiner/divider 406. The down-converter 402 is configured to down-convert a second RF signal received from the transceivers 301 based on the LO signal into a second IF signal. Converter 405 further includes a first transmit/receive switch (e.g., transmit/receive switch 404) to switch at a given point in time to transmit the first RF signal or to receive the second RF signal. Converter 405 further includes a second transmit/receive switch (e.g., transmit/receive switch 403) coupled between an IF IO port of converter 405 and the up-converter 401, and down-converter 402. Transmit/receive switch 403 is to switch at a given point in time to transmit the first IF signal or to receive the second IF signal.

In one embodiment, the up-converter 401 includes an IFIQ generator 311 to receive the first IF signal, an LOIQ generator 314 to receive the LO signal from the PLL 231 to generate an LOIQ signal based on the LO signal, and an up-convert mixer 313 coupled to the IFIQ generator 311 and the LOIQ generator 314. The up-convert mixer 313 is configured to generate the first RF signal based on the first IF signal and the LOIQ signal. In one embodiment, the up-converter 401 further includes an IF amplifier 312 coupled between the IFIQ generator 311 and the up-convert mixer 313 to amplify the first IF signal. The up-converter 401 can be coupled to power divider 406 to divide the first RF signal into a number of first RF sub-signals, where each first RF sub-signal is provided to one of the transceivers 301 to be transmitted.

In one embodiment, the down-converter 402 includes LOIQ generator 314 to receive the LO signal from PLL 231 to generate an LOIQ signal based on the LO signal, a down-convert mixer 322 coupled to the LOIQ generator 314. The down-convert mixer 322 is configured to generate an IFIQ signal based on the second RF signal received from the transceivers 301 and the LOIQ signal. The down-converter 402 further includes an IFIQ combiner 325 to generate the second IF signal based on the IFIQ signal received from the down-convert mixer 322. In one embodiment, the down-converter 402 is coupled to power combiner 406. The power combiner 406 is configured to combine second RF sub-signals received from the transceivers 301 to generate the second RF signal, each second RF sub-signal corresponding to one of the transceivers 301. The down-converter 402 can further include an IF amplifier 324 coupled between the IFIQ combiner 325 and the down-convert mixer 322 to amplify the IFIQ signal.

In one embodiment, each of the transceivers 301 includes a transmitter (e.g., transmitters 303) to transmit RF signals to a remote device, a receiver (e.g., receivers 304) to receive RF signals from the remote device, a first transmit/receive switch (e.g., switches 306) configured to couple the transmitter or the receiver to one of the antennas at a given point in time, and a second transmit/receive switch (e.g., switches 307) configured to couple the transmitter to a transmitting path (or up convert path) of converter 405 and the receiver to a receiving path (or down convert path) of converter 405 at a given point in time. Each of the antennas can correspond to one of the transceivers 301. Note that converter 405 (e.g., up-converter 401 and down-converter 402) are utilized and shared by all of transceivers 301 for the H circuitry. In other embodiments, each of the transceivers may have a corresponding converter, whose functionalities and/or operations are identical or similar to those of converter 405.

According to one embodiment, each of transmitters 303 includes a phase shifter (e.g., phase shifters 411A-411B, collectively referred to as phase shifter(s) 411). Phase shifter 411 is configured to shift a signal phase such as an RF signal in a desired direction. In addition, each of transmitters 303 may include a variable gain amplifier (e.g., variable gain amplifiers 412A-412B, collectively referred to as variable gains amplifier(s) 412). Variable gain amplifier 412 is configured to compensate the amplitude variation due to the phase shifting operation by phase shifter 411. In one embodiment, in response to a specific shifted phase, variable gain amplifier 412 is configured to look up in a lookup table (not shown) based on the shifted phase to obtain a gain value and to adjust the gain of the variable gain amplifier 412 for amplitude compensation.

According to one embodiment, each of receivers 304 includes a phase shifter (e.g., phase shifters 413A-413B, collectively referred to as phase shifter(s) 413). The functionalities of operations phase shifters 413 are identical or similar to phase shifters 411. Each of receivers 304 may further include a variable gain amplifier (e.g., variable gain amplifiers 414A-414B, collectively referred to as variable gain amplifier(s) 414). The functionalities or operations of variable gain amplifiers 414 are identical or similar to variable gain amplifiers 412.

In one embodiment, power divider 406 is configured to receive an RF signal from mixer 313 and to divide the RF signal into a number of RF signals with a lower power (e.g., 1/N of the original signal power as received from mixer 313, where N represents the number of transmitters 313), referred to as RF sub-signals. The RF sub-signals are then fed to transmitters 303 to be processed. In addition, power combiner 406 is configured to combine the RF sub-signals from all of the receivers 304, for example, by adding the power of all the RF sub-signals together to boost the signal strength. The combined RF signal is then fed to mixer 322 to be processed.

In some of the above embodiments, since the functionalities of converter 405 (e.g., up-converter 401 and down converter 402) are shared by transceivers 301, the physical size and DC power consumption of the RF frontend IC device can be reduced, in comparison to dedicated converters for each transceiver. However, the lookup operations performed by variable gain amplifier 412 may introduce latency, which may affect the beam switching performance of the RF frontend IC device dependent upon the specific circumstances. In addition, the configuration shown is only able to transmit or receive one beam at a given time.

Figure 5:
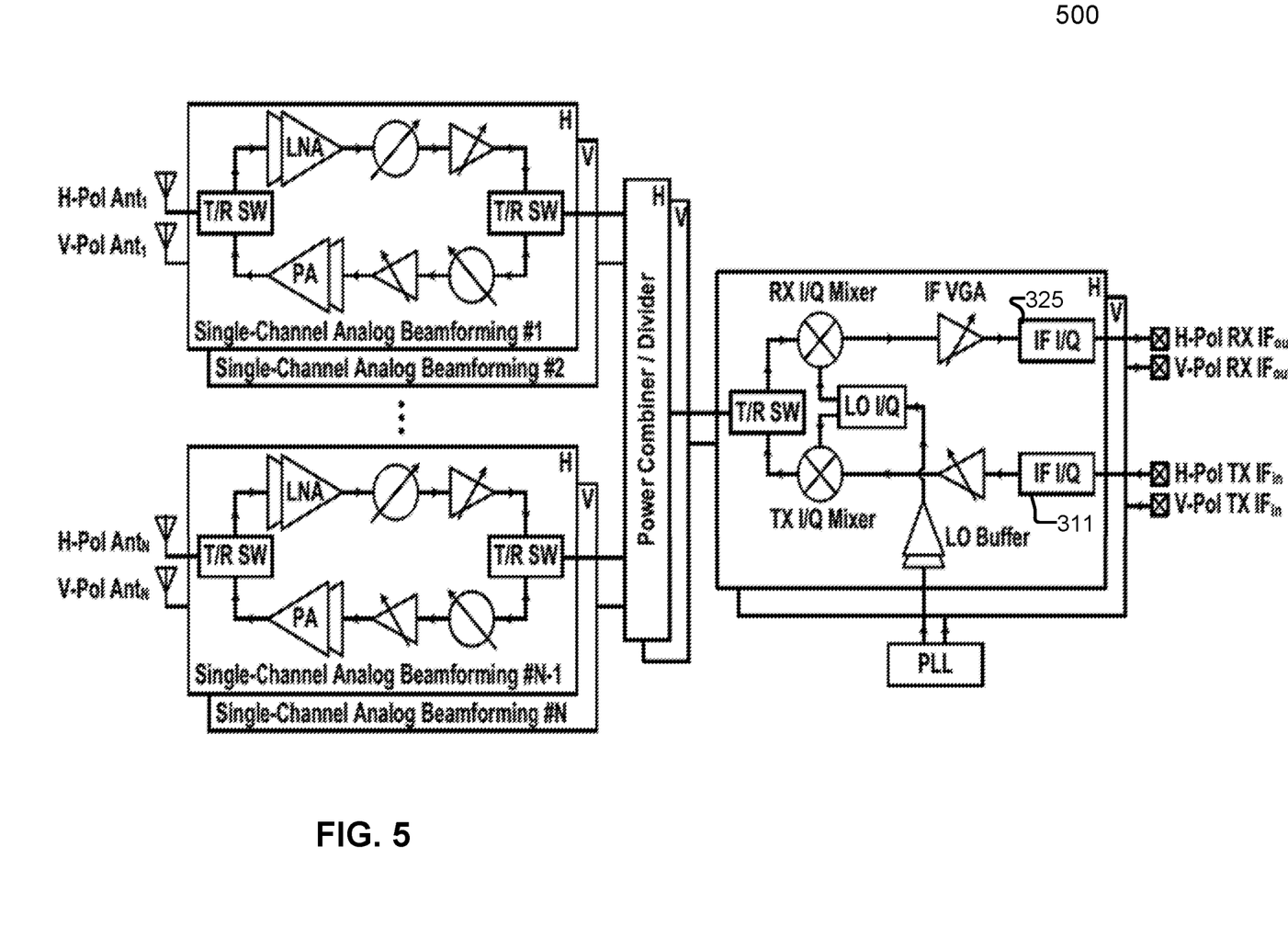
FIG. 5 is a block diagram illustrating an example of a dual-polarization millimeter-wave transceiver front-end with dual-stream TX input and dual-stream RX output according to one embodiment.

FIG. 5 is a block diagram illustrating an example of a dual-polarization millimeter-wave transceiver front-end with dual-stream TX input and dual-stream RX output according to one embodiment. Referring to FIG. 5, RF frontend IC device 500 may represent RF frontend IC device 101 as described above. RF frontend IC device 500 can be similar to RF frontend IC device 400 of FIG. 4 except for transmit/receive switch 403 of FIG. 4. For example, RF frontend IC device 500 includes a first polarization (e.g., a horizontal polarization) circuitry (denoted by "H") and a second polarization (e.g., a vertical polarization) circuitry (denoted by "V"). The H circuitry is coupled to a horizontal polarization RX IF output, a horizontal polarization TX IF input, and antennas horizontally oriented to transmit and receive RF signals of the horizontal polarization (e.g., IFIQ combiner 325 outputs directly to a RX IF output port, and IFIQ generator 311 is to receive an input from a TX IF input port). The V circuitry is coupled to a vertical polarization RX IF output, a vertical polarization TX IF input, and antennas vertically oriented to transmit and receive RF signals of the vertical polarization. The H circuitry mirrors the V circuitry except for the difference in polarization, however, separate H and V circuitries support a dual stream, e.g., twice the data bandwidth. Note that in some embodiments, the first polarization can be a left hand circular polarization and the second polarization can be a right hand circular polarization.

Figure 6:
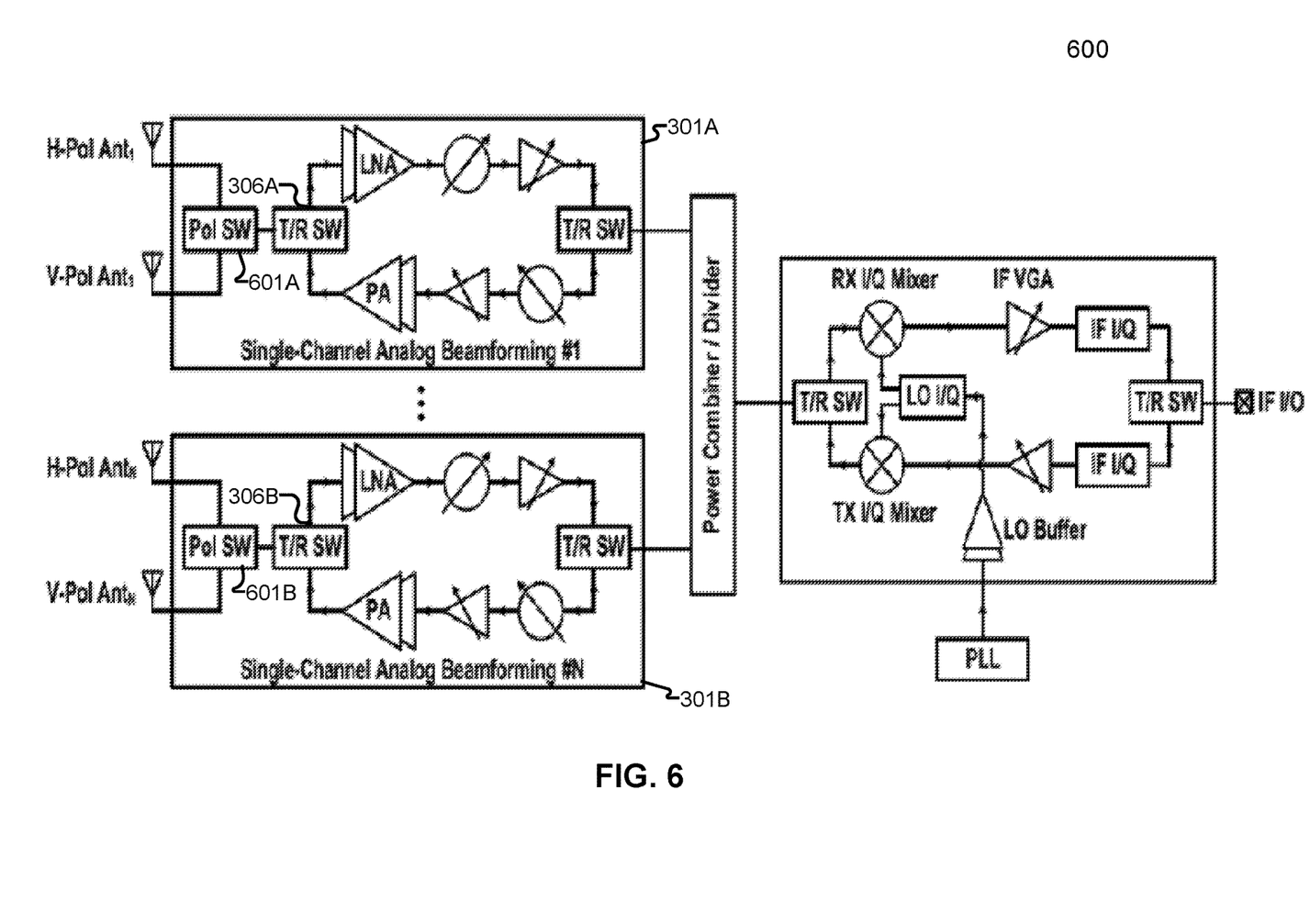
FIG. 6 is a block diagram illustrating an example of a dual-polarization millimeter-wave transceiver front-end with a polarization switch and combined I/O at IF according to one embodiment.

FIG. 6 is a block diagram illustrating an example of a dual-polarization millimeter-wave transceiver front-end with a polarization switch and combined I/O at IF according to one embodiment. Referring to FIG. 6, RF frontend IC device 600 may represent RF frontend IC device 101 as described above. RF frontend IC device 600 can be similar to RF frontend IC device 400 of FIG. 4 except for the addition of polarization switch 601 of FIG. 6 and combining of the H and V circuitries. For example, since the H circuitry and the V circuitry of FIG. 4 are similar in all respect, their functionality can be combined and the H and V circuitries are collapsed into one circuitry as illustrated by FIG. 6. However, the configuration shown is only able to transmit or receive a dual-stream having the same stream information. As illustrated by FIG. 6, in one embodiment, each of the transceivers 301 includes a polarization switch 601. The polarization switch is coupled between a first antenna (e.g., H polarization) and a second antenna (e.g., V polarization) and T/R switch 306. The polarization switch is configured to couple a transmitter or a receiver of a respective transceiver to the first or the second antenna at a given point in time to transmit/receive the first polarization or the second polarization of the RF signals.

Figure 7:
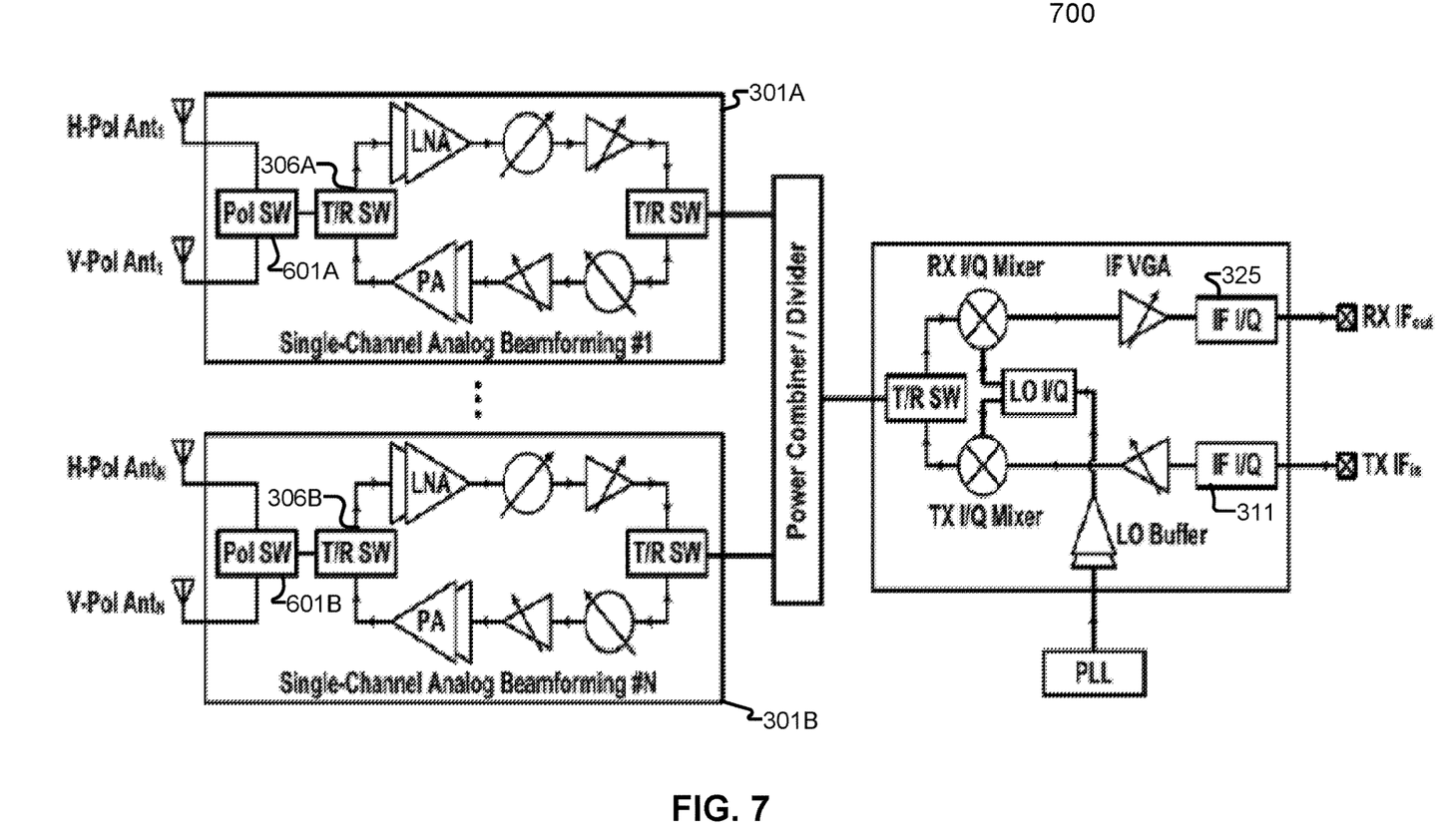
FIG. 7 is a block diagram illustrating an example of a dual-polarization millimeter-wave transceiver front-end with a polarization switch and separate TX input and RX output according to one embodiment.

FIG. 7 is a block diagram illustrating an example of a dual-polarization millimeter-wave transceiver front-end with a polarization switch and separate TX input and RX output according to one embodiment. Referring to FIG. 7, RF frontend IC device 700 may represent RF frontend IC device 101 as described above. RF frontend IC device 700 can be similar to RF frontend IC device 500 of FIG. 5 except for a combining of the H and V circuitries. For example, since the H circuitry and the V circuitry of FIG. 5 are similar in all respect, their functionality can be combined and the H and V circuitries are collapsed into one circuitry as illustrated by FIG. 7. However, the configuration shown is only able to transmit or receive a dual-stream having the same stream information. As illustrated by FIG. 7, in one embodiment, each of the transceivers 301 includes a polarization switch 601. The polarization switch is coupled between a first antenna (e.g., H polarization) and a second antenna (e.g., V polarization) and T/R switch 306. The polarization switch is configured to couple a transmitter or a receiver of a respective transceiver to the first or the second antenna at a given point in time to transmit/receive the first polarization or the second polarization of the RF signals.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A radio frequency (RF) frontend integrated circuit (IC) device, the RF frontend IC device comprising:
a first transceiver to transmit and receive RF signals at a first polarization and a second polarization associated with a first RF channel according to a first amplitude and phase shift setting within a predetermined frequency band, wherein the first transceiver comprises:
a first transmitter,
a first receiver,
a first transmit/receive switch coupled to the first transmitter and the first receiver,
a first polarization switch coupled between the first transmit/receive switch and a first antenna oriented in the first polarization and a first antenna oriented in the second polarization, wherein the first polarization switch is configured to couple the first transmitter or the first receiver to the first antenna oriented in the first polarization or the first antenna oriented in the second polarization, and
wherein the first transmit/receive switch is configured to couple the first transmitter or the first receiver to the first polarization switch, such that the first transmitter is to transmit RF signals or the first receiver is to receive RF signals in the first polarization or the second polarization at a given point in time;
a second transceiver to transmit and receive RF signals at the first polarization and the second polarization associated with a second RF channel according to a second amplitude and phase shift setting within the predetermined frequency band, wherein the second transceiver comprises:
a second transmitter,
a second receiver,
a second transmit/receive switch coupled to the second transmitter and the second receiver,
a second polarization switch coupled between the second transmit/receive switch and a second antenna oriented in the first polarization and a second antenna oriented in the second polarization, wherein the second polarization switch is configured to couple the second transmitter or the second receiver to the second antenna oriented in the first polarization or the second antenna oriented in the second polarization, and
wherein the first transmit/receive switch is configured to couple the second transmitter or the second receiver to the second polarization switch, such that the second transmitter is to transmit RF signals or the second receiver is to receive RF signals in the first polarization or the second polarization at a given point in time;

a converter coupled to the first transceiver and the second transceiver, wherein the converter comprises:

an up-converter to up-convert a first intermediate frequency (IF) signal based on a local oscillator (LO) signal into a first RF signal to be transmitted by at least one of the first or the second transceivers in the first polarization or the second polarization, a down-converter to down-convert a second RF signal in the first polarization or the second polarization received from the first or the second transceivers based on the LO signal into a second IF signal, and an LO in-phase/quadrature (I/Q) generator configured to receive the LO signal from a phase-lock loop (PLL) to generate an LO I/Q signal based on the LO signal, wherein the LO I/Q signal is provided to the up-converter and the down-converter;

and a power combiner/divider coupled between each of the first and second transceivers and the converter, wherein the power combiner/divider is configured to combine and divide RF signals exchanged between each of the first and second transceivers and the converter.

2. The RF frontend IC device of claim 1, wherein the first transceiver further comprises a third transmit/receive switch coupled to the first transmitter and the first receiver, wherein the third transmit/receive switch is configured to couple the first transmitter or the first receiver to the converter at a given point in time, such that the converter is to process signals associated with the first transmitter or the first receiver.

3. The RF frontend IC device of claim 2, wherein when the first transmit/receive switch couples the first transmitter to the first antenna oriented in the first polarization or the first antenna oriented in the second polarization via the first polarization switch, the third transmit/receive switch is configured to couple the first transmitter to the converter.

4. The RF frontend IC device of claim 3, wherein when the first transmit/receive switch couples the first receiver to the first antenna oriented in the first polarization or the first antenna oriented in the second polarization via the first polarization switch, the third transmit/receive switch is configured to couple the first receiver to the converter.

5. The RF frontend IC device of claim 2, wherein the second transceiver further comprises a fourth transmit/receive switch coupled to the second transmitter and the second receiver, wherein the fourth transmit/receive switch is configured to couple the second transmitter or the second receiver to the converter at a given point in time, such that the converter is to process signals associated with the second transmitter or the second receiver.

6. The RF frontend IC device of claim 5, wherein when the second transmit/receive switch couples the second transmitter to the second antenna oriented in the first polarization or the second antenna oriented in the second polarization via the second polarization switch, the fourth transmit/receive switch is configured to couple the second transmitter to the converter.

7. The RF frontend IC device of claim 6, wherein when the second transmit/receive switch couples the second receiver to the second antenna oriented in the first polarization or the second antenna oriented in the second polarization via the second polarization switch, the fourth transmit/receive switch is configured to couple the second receiver to the converter.

8. The RF frontend IC device of claim 5, wherein the converter further comprises a fifth transmit/receive switch coupled between the power combiner/divider and the up-converter and the down converter, wherein the fifth transmit/receive switch is configured to couple the up-converter or the down-converter to the power combiner/divider at a given point in time.

9. The RF frontend IC device of claim 8, wherein when the first transmitter or the second transmitter are coupled to the power combiner/divider via the third and fourth transmit/receive switches respectively, the fifth transmit/receive switch is configured to couple the up-converter to the power combiner/divider.

10. The RF frontend IC device of claim 9, wherein when the first receiver or the second receiver are coupled to the power combiner/divider via the third and fourth transmit/receive switches respectively, the fifth transmit/receive switch is configured to couple the down-converter to the power combiner/divider.

11. The RF frontend IC device of claim 8, further comprising an IF input and output (I/O) interface to be coupled to a baseband processor, wherein the converter further comprises a sixth transmit/receiver switch coupled between the IF I/O interface and the up-converter and the down-converter.

12. The RF frontend IC device of claim 11, wherein when the fifth transmit/receive switch couples the up-converter to the power combiner/divider, the sixth transmit/receive switch is configured to couple the up-converter to the IF I/O interface.

13. The RF frontend IC device of claim 12, wherein when the fifth transmit/receive switch couples the down-converter to the power combiner/divider, the sixth transmit/receive switch is configured to couple the down-converter to the IF I/O interface.

14. The RF frontend IC device of claim 1, wherein the first polarization is a horizontal polarization and the second polarization is a vertical polarization.

15. The RF frontend IC device of claim 1, wherein the first polarization is a left hand circular polarization and the second polarization is a right hand circular polarization.

16. The RF frontend IC device of claim 1, wherein the power combiner/divider is configured to divide the first RF signal into a first set of RF sub-signals to be transmitted by the first and second transmitters.

17. The RF frontend IC device of claim 16, wherein the power combiner/divider is configured to combine a second set of RF signals received from the first and second receivers into the second RF signal.

18. The RF frontend IC device of claim 1, wherein the first and second transceivers are two of a plurality of transceivers coupled to the power combiner/divider, each of the plurality of transceivers corresponding to one of a plurality of RF channels.

19. The RF frontend IC device of claim 18, wherein each of the plurality of transceivers is associated with a specific pair of antennas corresponding to the first polarization and the second polarization.

20. The RF frontend IC device of claim 1, wherein the converter further comprises an LO buffer coupled between the LO I/Q generator and the PLL to buffer the LO signal.

* * * * *